(12) United States Patent
Satran et al.

(10) Patent No.: US 6,299,180 B1
(45) Date of Patent: Oct. 9, 2001

(54) TOOL ASSEMBLY (75) Inventors: Amir Satran, Kfar Vradim; Andrei Petrilin, Qiryat Ata, both of (IL)

(73) Assignee: Iscar Ltd., Tefen (IL)

( * ) Notice: Subject to any disclaimer, the term of this patent is extended or adjusted under 35 U.S.C. 154(b) by 0 days.

(21) Appl. No.: 09/458,674

(22) Filed: Dec. 10, 1999

(30) Foreign Application Priority Data

Dec. 31, 1998 (IL) .......................................... 127895

(51) Int. Cl.$^7$ .................................................. B23B 31/107
(52) U.S. Cl. .............................. 279/83; 403/362; 407/40; 408/233; 408/713
(58) Field of Search ................................ 279/83; 403/362, 403/379.3; 407/40, 104; 409/234; 408/233, 713

(56) References Cited

U.S. PATENT DOCUMENTS

| 4,511,294 | 4/1985 | Grunsky et al. . |
| 4,575,292 | 3/1986 | Pape et al. . |
| 4,647,052 | * 3/1987 | Butikofer ................................ 279/83 |
| 5,403,134 | * 4/1995 | Andersson et al. ..................... 279/83 |

* cited by examiner

Primary Examiner—Steven C. Bishop
(74) Attorney, Agent, or Firm—Pennie & Edmonds LLP (57) ABSTRACT

A clamping mechanism for clamping a cutting head to an adaptor; the adaptor having a shank receiving bore and three forwardly slanted unthreaded through bores; the cutting head for clamping to the adaptor having a shank with three forwardly slanted threaded bores.

The arrangement being such that with the shank inserted into the shank receiving bore the cutting head is clamped to the adaptor by three retaining screws which pass through the unthreaded through bores and are threadingly engaged by the threaded bores.

18 Claims, 9 Drawing Sheets

TOOL ASSEMBLY

FIELD OF THE INVENTION

The present invention relates to a clamping mechanism in general and to the clamping of cutting heads to tool holder adaptors in particular.

BACKGROUND OF THE INVENTION

Figure 1:
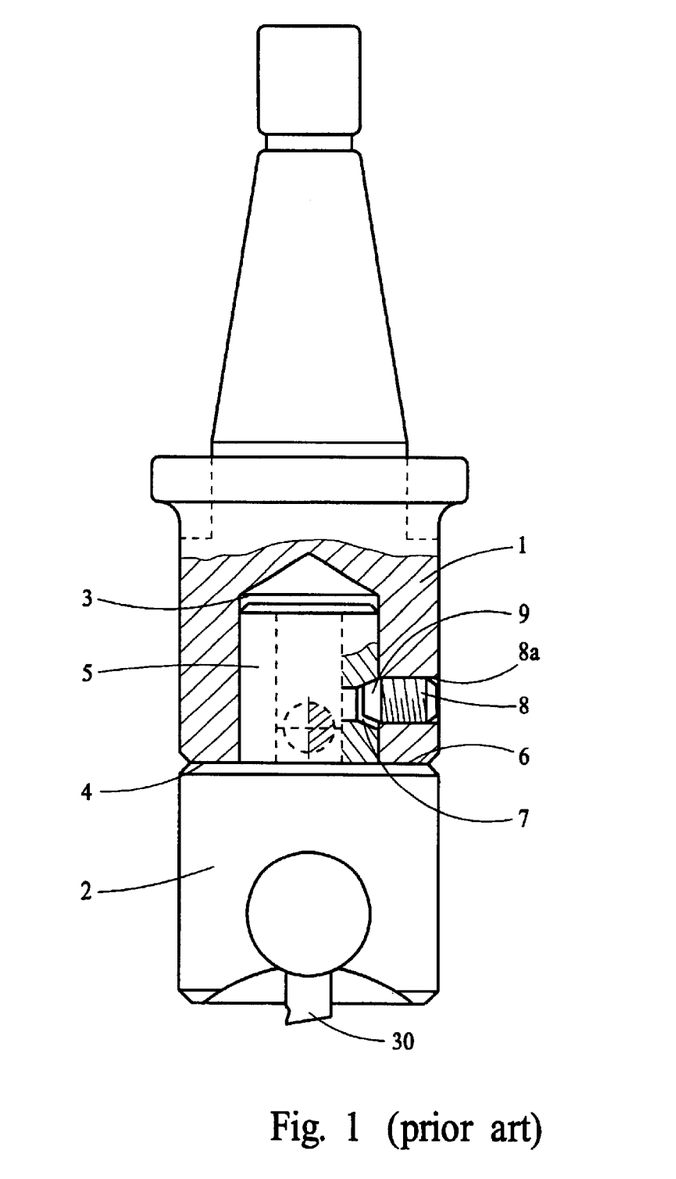
FIG. 1 is a partially sectioned side view of a prior art cutting tool assembly.

An example of a clamping mechanism employing retaining screws for clamping a cutting head to a tool holder adaptor is described in U.S. Pat. No. 4,575,292 and is shown in FIG. 1. When this type of clamping mechanism is used in cutting tools having relatively small diameters a certain problem arises that is negligible or does not arise at all, for large diameter cutting tools. This problem entails the distortion of portions of the cutting tool body as a result of radial forces that exist between the retaining screws and the cutting tool body and the fact that for small diameters the body of the tool will distort under the influence of these radial forces.

FIG. 1 will be used as a reference to illustrate the distortion problem, which will be described with reference to FIGS. 2 to 5 that show various sectional views of the tool shown in FIG. 1. However, not all the features of the cutting tool shown in FIG. 1 are relevant to understanding the problem at hand. Therefore, FIGS. 2 to 5 are only illustrative sectional views of FIG. 1 showing only relevant features. Furthermore, for illustrative purposes some of the spaces between various parts and the distortions thereof have been exaggerated. FIG. 1 shows a cutting tool assembly comprising a cutting head 2 clamped to an adaptor 1. The cutting head has a cutting insert 30 mounted at its front end, and is provided with a shank 5 at its rear end. The adaptor has a bore 3 at its front end in which the shank 5 is co-axially mounted.

The periphery of the adaptor is provided with a threaded through bore 8a (This numeral has been added. The rest of the numerals in FIGS. 1 to 5 are as in the '292 patent.). The shank 5 is provided with a conical bore 7 capable of receiving therein a retaining screw 8 which is screwingly engaged into the threaded bore 8a. When mounting the cutting head on the adaptor, the shank 5 of the cutting head is inserted into the bore 3 of the adaptor until the cutting head abutting surface 6 abuts against the adaptor abutting surface 4. The retaining screw 8 is now screwed into the threaded bore 8a in order to clamp the cutting head 2 to the adaptor 1. The clamping of the cutting head can be considered as a two step process. In the first step the retaining screw is fully screwed into the threaded bore, enters the conical bore 7, but is not firmly tightened. The screw's conical turned end 9 abuts against the conical bore 7 thereby pushing the shank 5 away from the threaded bore 8a towards the adaptor inner wall remote from the threaded bore and at the same time pushing the shank rearwardly relative to the adaptor 1. At this stage the cutting head cannot be released from the adaptor, but it is not securely clamped in position. In the second step the retaining screw is firmly tightened (see FIG. 2), ensuring that the axial component Fa of the retaining force F forces the cutting head 2 rearwardly relative to the adaptor 1 whereby the firm abutting of the cutting head abutting surface 6 against the adaptor abutting surface 4 is obtained.

Such a clamping mechanism has a disadvantage that limits the use of the cutting tool assembly in some milling operations due to instability and inaccuracy problems, as will be described below.

Figure 2:
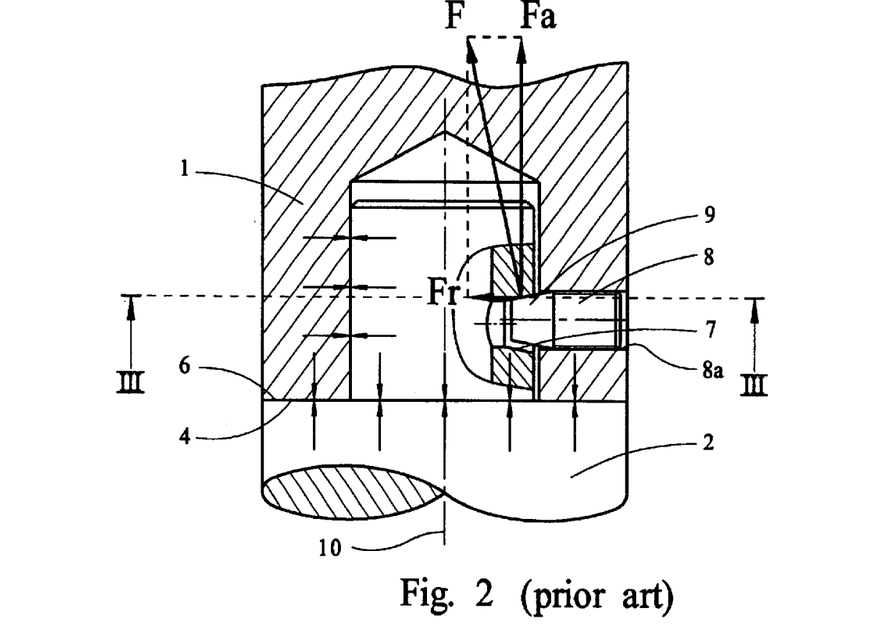
FIG. 2 is a partially sectioned side view of a part of another prior art cutting tool assembly illustrating the clamping of the cutting head to the adaptor.
Figure 3:
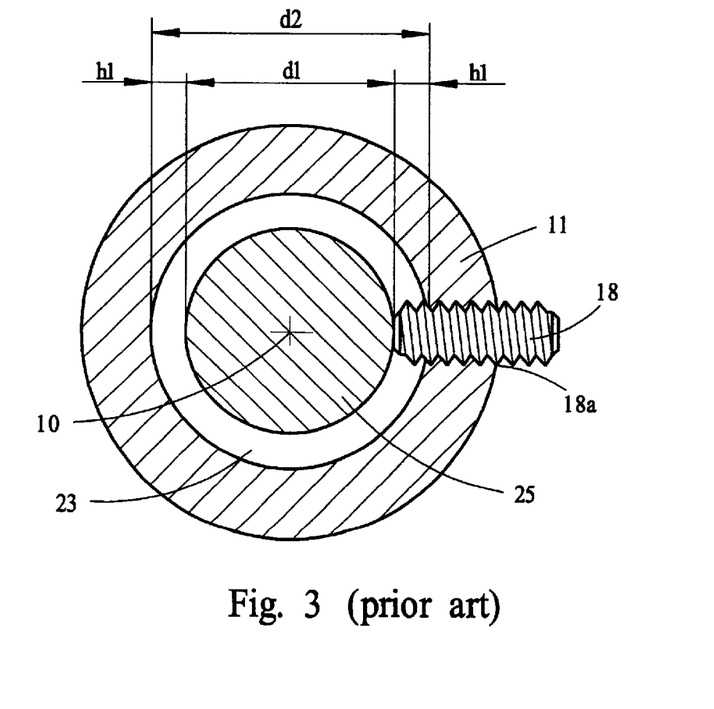
FIG. 3 is a schematic cross-sectional view of a tool from the kind shown in FIG. 2 taken along line III—III.

FIG. 3 is a cross-sectional view of a cutting tool assembly similar to that shown in FIG. 2 taken in a plane perpendicular to the axis 10 of the adaptor 11 in the region of contact between the conical end 9 of the screw and the conical bore 7.

As can be seen in FIG. 3, prior to forcibly screwing the retaining screw 18, there is a gap between the shank 25 and the adaptor 11. This gap, of dimension h1, is due to the difference between the outer diameter d1 of the cutting head shank and the inner diameter d2 of the adaptor. This gap which, for illustrational purposes, is shown to be uniform all around the adaptor bore is the required clearance which is essential for the free insertion of the cutting head shank into the adaptor bore. The required clearance is typically in the order of magnitude of 0.02 mm.

Figure 4:
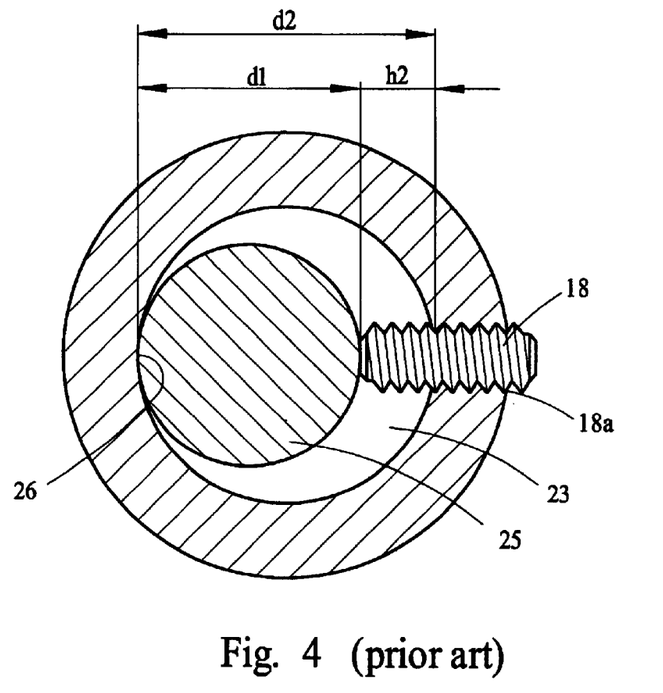
FIGS. 4 and 5 show, respectively, first and second steps of fastening the retaining screw of the tool in FIG. 3.
Figure 5:
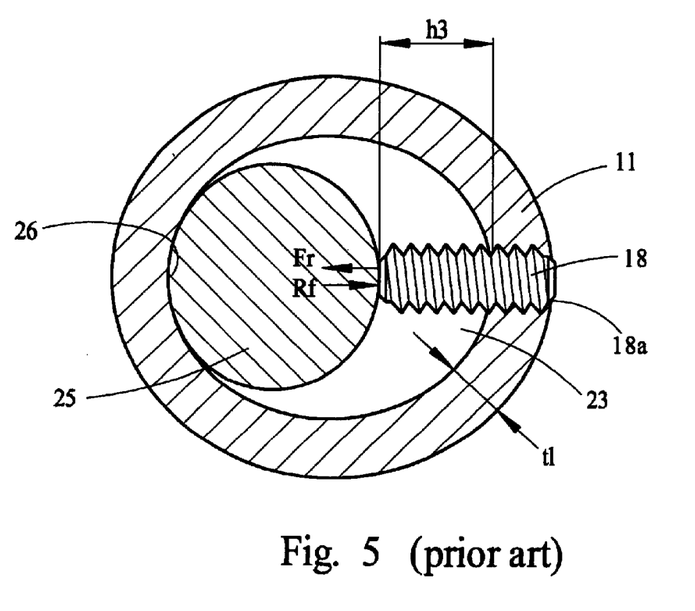

FIGS. 4 and 5 show the result of fastening the retaining screw by means of the action of the radial component Fr of the retaining force F, as a two step process. In the first step, as shown in FIG. 4, the retaining screw 18 radially pushes the cutting head shank 25 away from the screw through bore 18a towards the adaptor inner wall 26 remote from the bore 18a . When the shank 25 touches the wall 26, the distance between the through bore 18a and the shank 25 becomes h2, which is twice the initial distance h1 between the shank 25 and the adaptor bore 23. In the second step, as shown in FIG. 5, in order to ensure firm abutting of the cutting head shank 25 against the inner wall 26 and, also, to ensure self-locking of the retaining screw 18, the screw must be forcibly additionally screwed. The greater the radial component Fr of the retaining force F the greater the reaction force Rf acting on the screw in the opposite direction to the force Fr. FIG. 5 shows the assembly of FIG. 4 after the retaining screw 18 was forcibly additionally screwed. As can be seen, the forced screwing distorts the adaptor 11, in the screw's axial direction, to a distance h3 between the cutting head shank 25 and the through bore 18a. The distance h3 is greater than the distance h2. This means, in practice, that the shank is not best supported in the adaptor bore, and the shank 25 and the adaptor 11 are not co-axial, which, of course, leads to inaccuracy and instability of the cutting tool assembly.

The disadvantages of the clamping mechanism described above are more pronounced in small diameter adaptors where the thickness of the adaptor wall t1 is relatively small. Clearly, the thinner the adaptor wall the greater the distortion for a given tightening force of the retaining screw. In order to overcome this disadvantage the wall thickness can be increased, but, this may give rise to other difficulties when performing deep pocketing applications because the adaptor external diameter may become larger than the cutting head diameter, a fact that limits the use of the cutting head to depths less than its length.

Figure 6:
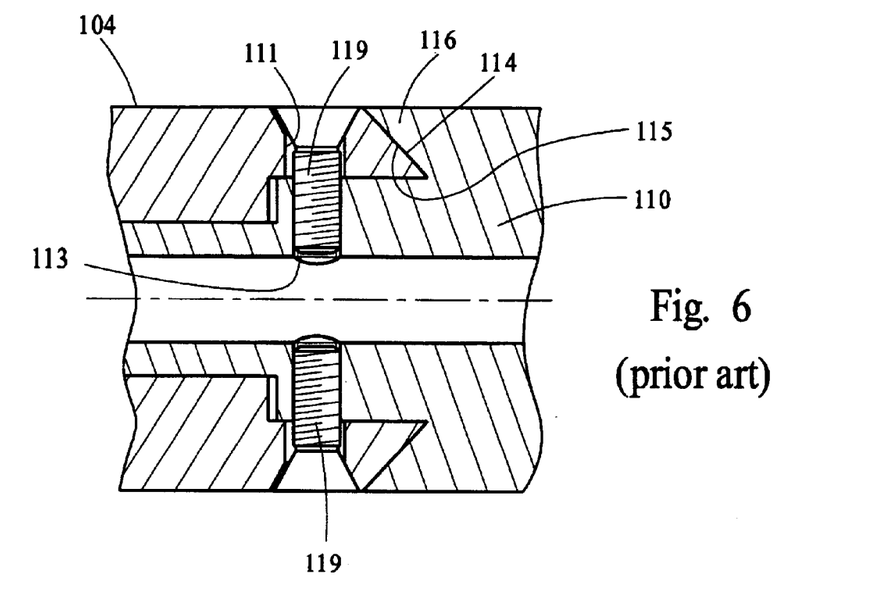
FIG. 6 is a side cross-sectional view of another prior art cutting tool assembly.

Another example of a clamping mechanism employing retaining screws for clamping a cutting head to a tool holder adaptor is described in U.S. Pat. No. 4,511,294. FIG. 6 is a cross-sectional view similar to FIG. 5 in '294. The reference numerals used herein are compatible with the reference numerals used in '294 with 100 added to them.

As shown in FIG. 6, a stub 110 of a shank 103 is inserted into the legs 108 of an adaptor 104. The stub having radially extending threaded bores 113. The legs having radially extending holes 111. The axes of the threaded bores 113 and the holes 111 are parallel and offset relative to one another. When screws 119 having conical heads are inserted into the holes 111 and fully screwed into the threaded bores 113 they urge the rear edge face 114 of the legs 108 against the respective surface 115 of the shank's shoulder 116. As can be seen, firm abutting is obtained by the axial relative movement between the shank 103 and the adaptor 104 whereby the rear end portions of the legs 108 are wedged into the spaces which are inwardly adjacent to the respective surfaces 115 of the shank's shoulder 116 thus preventing the legs 108 from moving away from each other. In accordance with '294 firm abutting between the adaptor 104 and the shank 103 is not obtained solely by the radial tightening of the screws 119 but also requires the wedging of the rear end portions of the legs 108 against the respective shank's shoulder 116. The latter being obtained by means of the axial displacement induced by the tightening of the screws 119.

Figure 7:
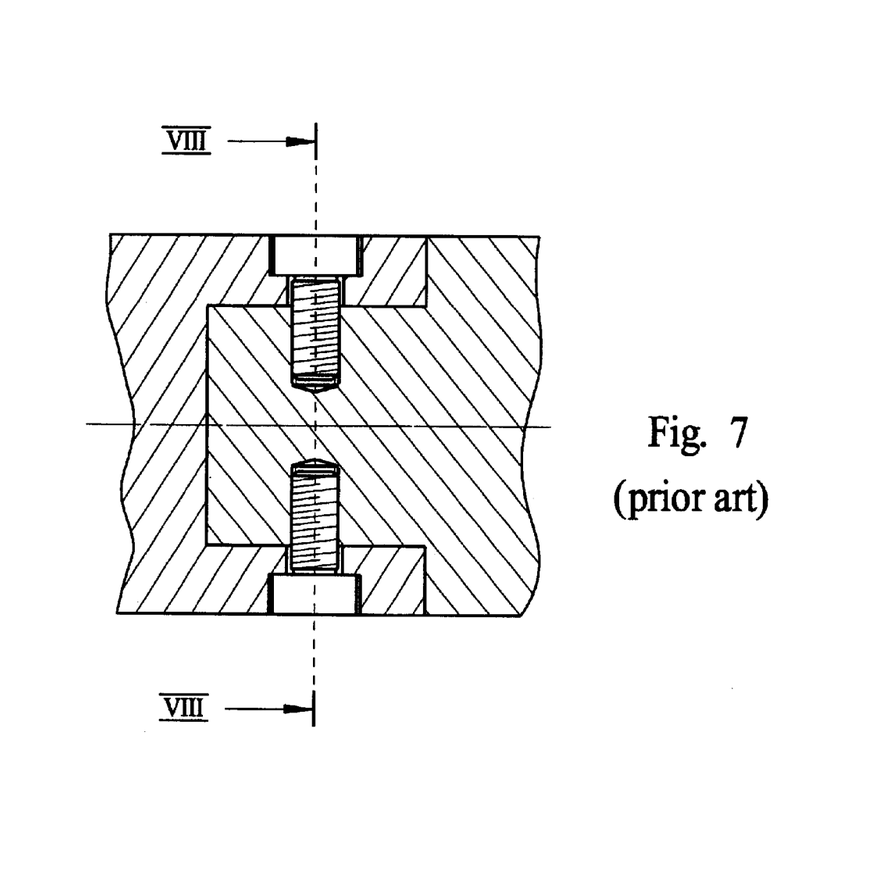
FIG. 7 is a schematic cross-sectional view of another assembly similar to that of FIG. 6.

Consideration will now be given to the effect of the radial tightening of the screws only. This is done by considering an assembly similar to that shown in FIG. 6 but without the wedging of the rear end faces 114 of the legs 108. Also, the conical head of each screw 119 is replaced by a cylindrical head. Such an assembly is shown in FIG. 7.

Figure 8:
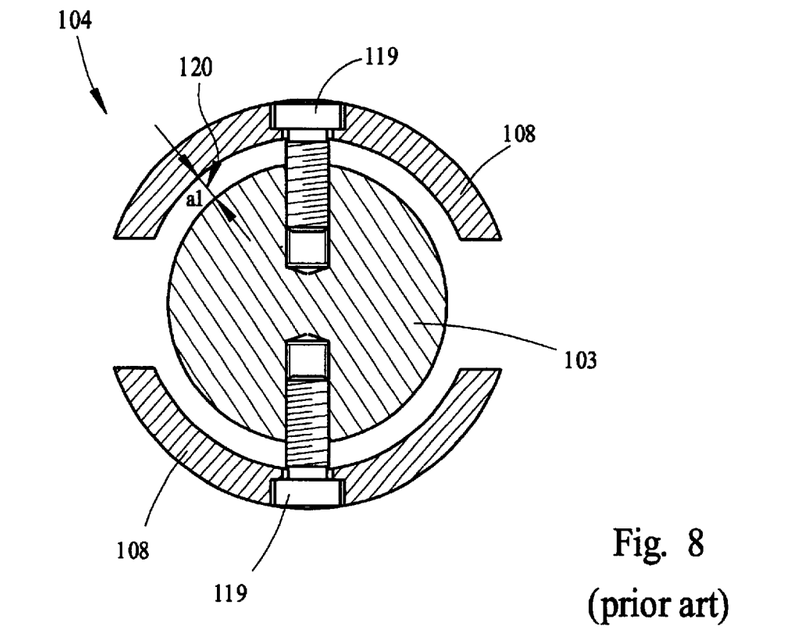
FIGS. 8 and 9 are schematic cross-sectional views of the assembly of FIG. 7 taken long line VIII—VIII.
Figure 9:
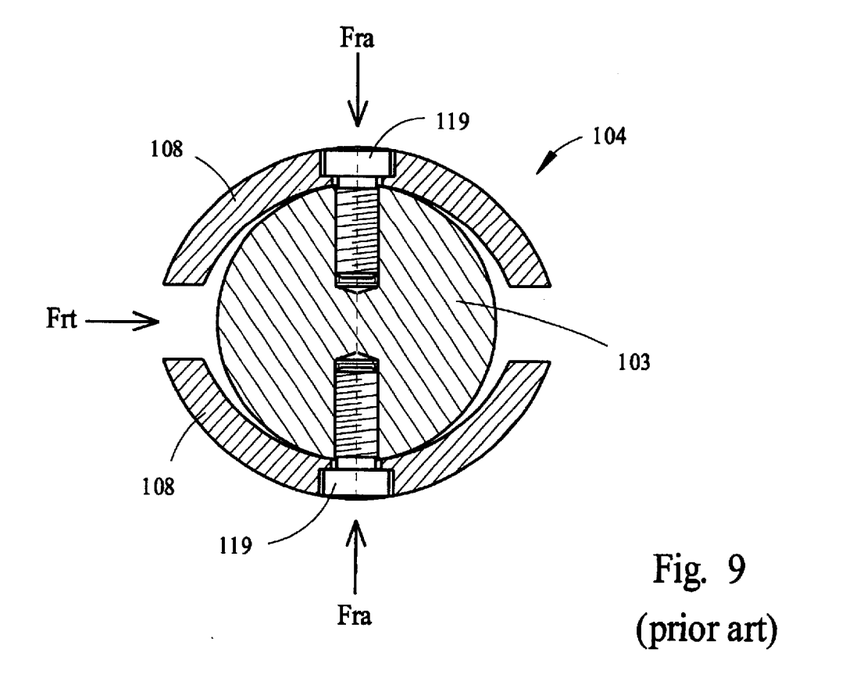

Again, it is mentioned that the spaces between the various parts and the distortions thereof, as illustrated in FIGS. 8 and 9, have been exaggerated for clarification purposes.

FIG. 8 shows the relative disposition between the shank 103 and the adaptor 104 prior to fastening the screws 119. A gap 120 of dimension a1 is the clearance between the shank 103 and the adaptor 104. The gap 120 is the necessary clearance for the free insertion of the shank 103 into the adaptor 104. In this position, the legs 108 of the adaptor 104 are peripherally equidistanced from the shank 103.

When the screws 119 are firmly tightened, as shown in FIG. 9, the legs 108 are pressed against the shank 103 by a radial retaining force Fra. In this position, the gap 120, along a line connecting the axes of the screws 119, diminishes. However, contact between the shank 103 and adaptor 104 takes place just in the vicinity of the screws 119 due to the construction of the legs 118. This introduces a clamping disadvantage since the adaptor 104 could move relative to the shank 103 when it is subjected to a radial force Frt transversely directed to the radial retaining force Fra.

It is the object of the present invention to provide a cutting tool assembly in which the above mentioned disadvantages are greatly reduced, or overcome.

SUMMARY OF THE INVENTION

In accordance with the present invention there is provided a clamping mechanism for clamping members of a tool assembly, the tool assembly comprising:

a shank receiving member; and a mounting member for mounting thereon;

the mounting member having a rear surface and a shank with at least three clamping member receiving bores, the shank receiving member having a shank bore at a front face thereof and at least three unthreaded through bores, so that on inserting the shank into the shank bore the at least three unthreaded bores are adjacent to the at least three clamping member receiving bores, the mounting member being clamped to the shank receiving member by the at least three clamping members, the at least three clamping members passing through the at least three unthreaded through bores and retainably received in the at least three clamping member receiving bores.

In accordance with the preferred embodiment the at least three clamping members are screws and the at least three clamping member receiving bores are provided with a screw thread for threadingly engaging the screws.

Typically, each of said at least three screws comprises a threaded portion and a conical portion.

Preferably, said at least three unthreaded through bores are conical.

Generally, each of said at least three unthreaded through bores has an axis which is forwardly slanted.

Further generally, each of said at least three clamping member receiving bores has an axis which is forwardly slanted.

Preferably, said shank of said mounting member is cylindrical.

Further preferably, said shank bore is cylindrical.

Still further preferably, each of said at least three screws passes through said at least three unthreaded through bores, is threadingly engaged into said at least three threaded bores, and said axis of each of said at least three unthreaded through bores is rearwardly displaced relative to said axis of each of said at least three clamping member receiving bores.

Preferably, the front face of the shank receiving member is slanted with respect to the rear surface of the mounting member.

Further preferably, the front face of the shank receiving member is circumferentially continuous.

Optionally, said at least three clamping members constitute a group, the clamping mechanism having at least one group.

If desired, said mounting member constitutes a cutting head.

Also in accordance with the present invention there is provided a clamping mechanism for clamping a cutting head to an adaptor;

the adaptor having a shank receiving bore and three forwardly slanted unthreaded through bores;

the cutting head for clamping to the adaptor having a shank with three forwardly slanted threaded bores;

the arrangement being such that with the shank inserted into the shank receiving bore the cutting head is clamped to the adaptor by three retaining screws which pass through the unthreaded through bores and are threadingly engaged by the threaded bores.

BRIEF DESCRIPTION OF THE DRAWINGS

For a better understanding of the present invention and to show how the same may be carried out in practice, reference will now be made to the accompanying drawings, in which.

DETAILED DESCRIPTION OF A PREFERRED EMBODIMENT

Figure 10:
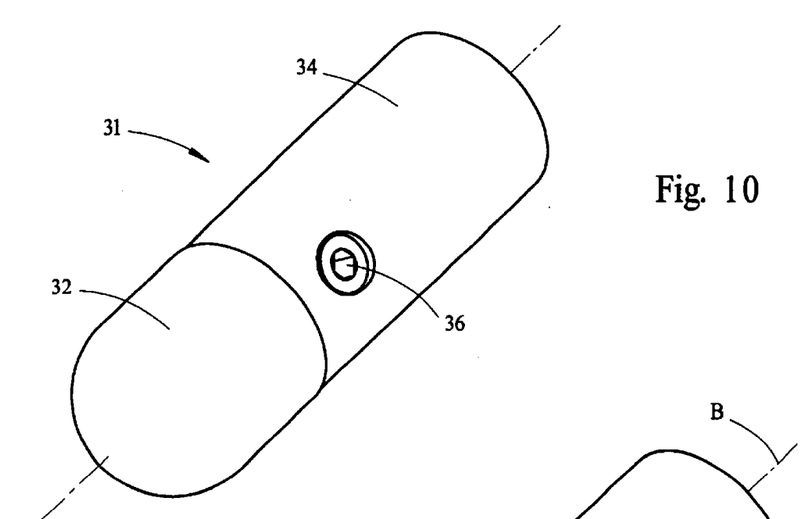
FIG. 10 is a perspective view of a cutting tool assembly according to the present invention.
Figure 11:
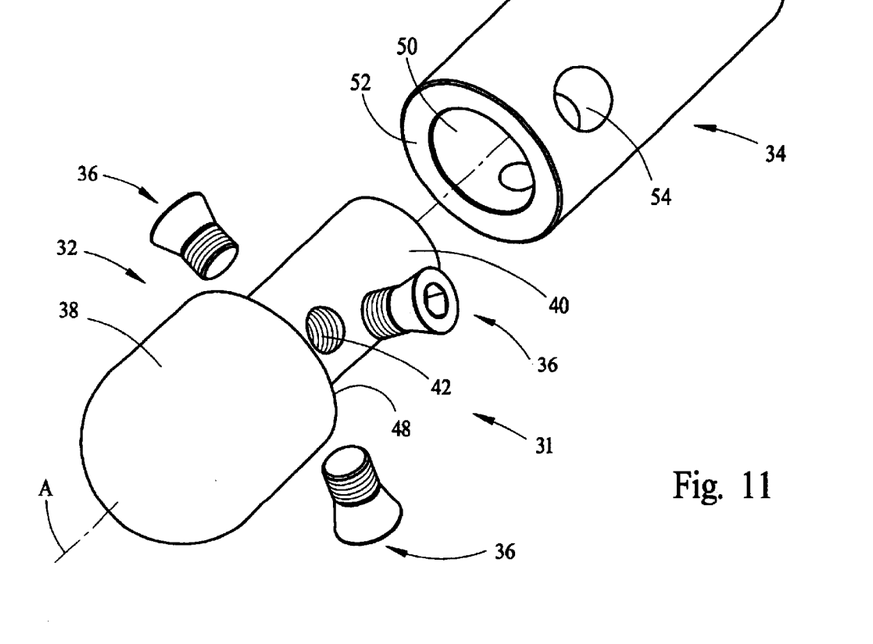
FIG. 11 is an exploded view of the cutting tool assembly shown in FIG. 10.
Figure 12:
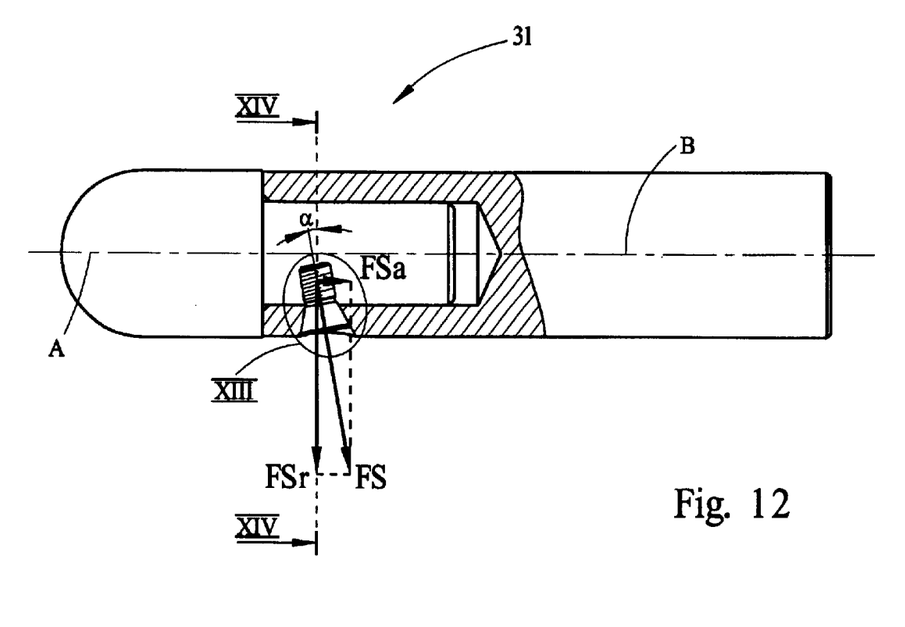
FIG. 12 is a partially sectioned side view of the cutting tool assembly shown in FIG. 10.
Figure 13:
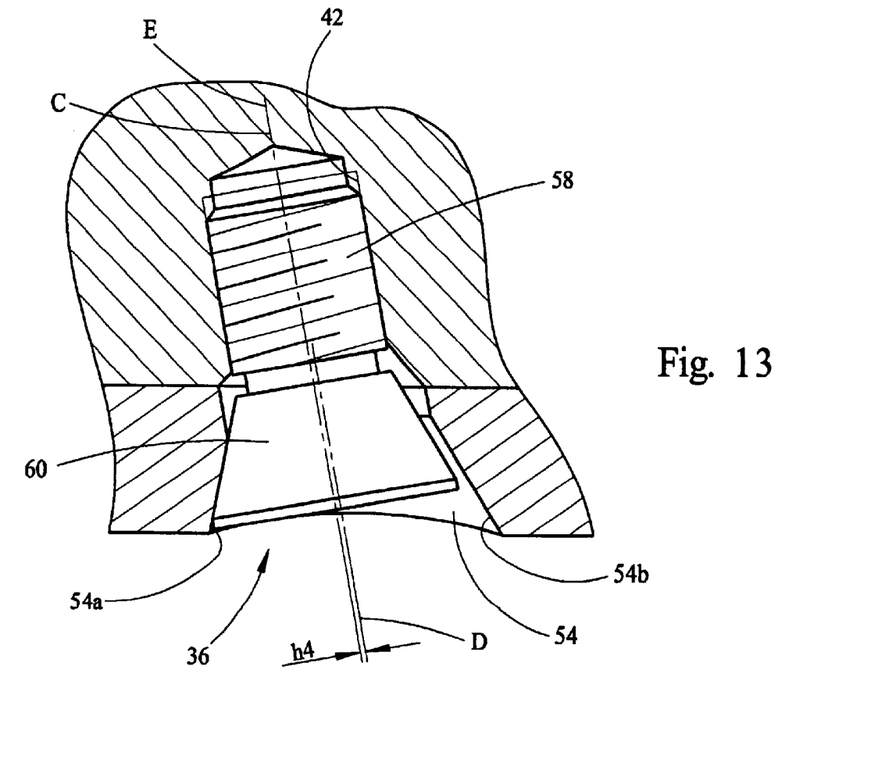
FIG. 13 is an enlarged cross-section of detail XIII in FIG. 12.

Attention is first drawn to FIGS. 10 to 13. FIG. 10 shows a cutting tool assembly 31 having a clamping mechanism according to the present invention. The cutting tool assembly 31 comprises a cutting head 32 constituting a mounting member, an adaptor 34 constituting a shank receiving member, and three retaining screws 36 (only one is seen in FIG. 10). FIG. 11 is an exploded view of the cutting tool assembly shown in FIG. 10. As shown in FIG. 11, the cutting head 32 consists of a cutting portion 38 integrally formed with a cylindrical shank 40 extending rearwardly from the cutting portion. It will be appreciated that the cutting portion 38 can be of any convenient form, for example, it can be formed with integral cutting edges or cutting inserts suitably retained thereto. These details have not been shown since they are not relevant to the present invention which is only concerned with the clamping between the cutting head and the adaptor. The diameter of the shank 40 is smaller than the diameter of the cutting head 32. The rear surface 48 of the cutting head 32 is flat and perpendicular to the axis A of the cutting head. On the periphery of the shank there are three threaded bores 42, each of which constitutes a clamping member receiving bore, each having an axis C (see FIG. 13) which traverses the axis A of the cutting head. The threaded bores 42 are equally peripherally spaced, and forwardly slanted at an acute angle α with respect to a radial direction perpendicular to the axis A of the cutting head (see FIG. 12). The adaptor 34 has a bore 50 extending rearwardly from the front face 52 of the adaptor and capable of receiving therein the shank 40 of the cutting head. The front face 52 is flat, circumferentially continuous, substantially perpendicular to the axis B of the adaptor and capable of abutting the rear surface 48 of the cutting head 32. It should be mentioned that the front face 52 is preferably slightly rearwardly slanted in an inward direction so that contact is first made between the peripheral region of the front face 52 with the rear surface 48. The adaptor further has on its periphery, adjacent the front face 52, three unthreaded conical through bores 54, each having an axis D (see FIG. 13) which passes through the axis B of the adaptor. The bores 54 are equally peripherally spaced, and forwardly slanted at an acute angle α with respect to a radial direction perpendicular to the axis B of the adaptor. The cutting tool assembly 31 further comprises three retaining screws 36 constituting clamping members. As seen in FIG. 13, each screw 36 is symmetrical around an axis E and comprises a threaded portion 58 and a conical portion 60.

The assembly of the cutting tool 31 will now be described. First, the shank 40 of the cutting head 32 is inserted into the corresponding bore 50 of the adaptor 34 until the rear surface 48 of the cutting head 32 abuts against the front face 52 of the adaptor 34. Next, the retaining screws 36 are inserted through the conical through bores 54 and threadingly engaged into the threaded bores 42. In this position, as seen in FIG. 13, the axis C of the threaded bore 42 merges with the axis E of the screw 36, and, they are both spaced a distance h4 from the axis D of the conical through bore 54. By locating the conical through bore slightly rearwardly relative to the threaded bore it is ensured, when tightening the screw, that the conical portion 60 of the screw 56 will always be in contact with the front portion 54a of the conical through bore 54 whilst the rear portion 54b of the conical through bore remains free. The aforementioned contact, forces by the action of the axial component FSa of the retaining force FS applied on the shank 40 by each of the retaining screws, the rearward displacement of the cutting head 32 relative to the adaptor 34. This displacement ensures the firm abutment of the rear surface 48 of the cutting head 32 against the front face 52 of the adaptor 34. Finally, the retaining screws 56 are firmly tightened.

Figure 14:
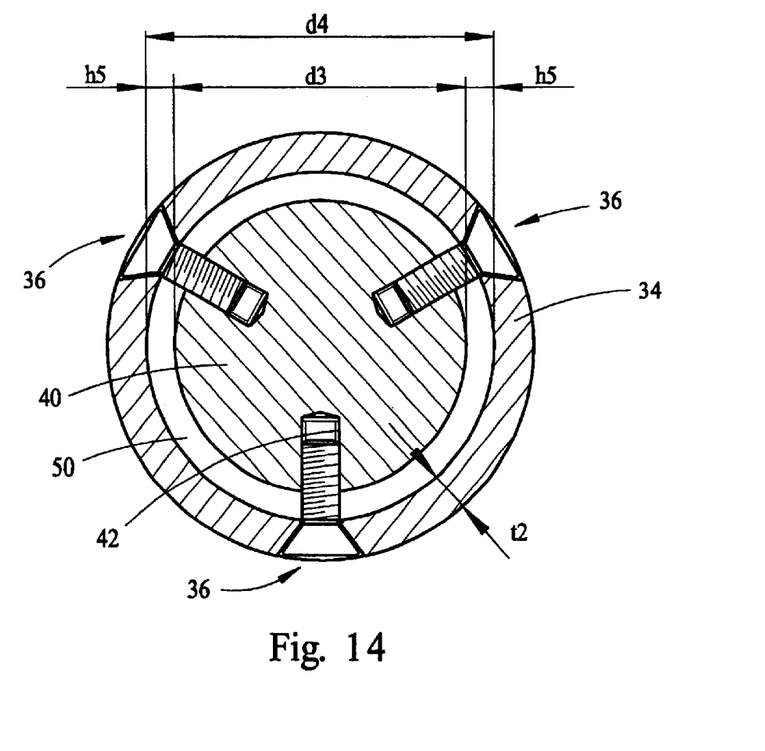
FIG. 14 is a schematic cross-sectional view of the cutting tool assembly shown in FIG. 12 taken along line XIV—XIV, before forcibly screwing the retaining screws.
Figure 15:
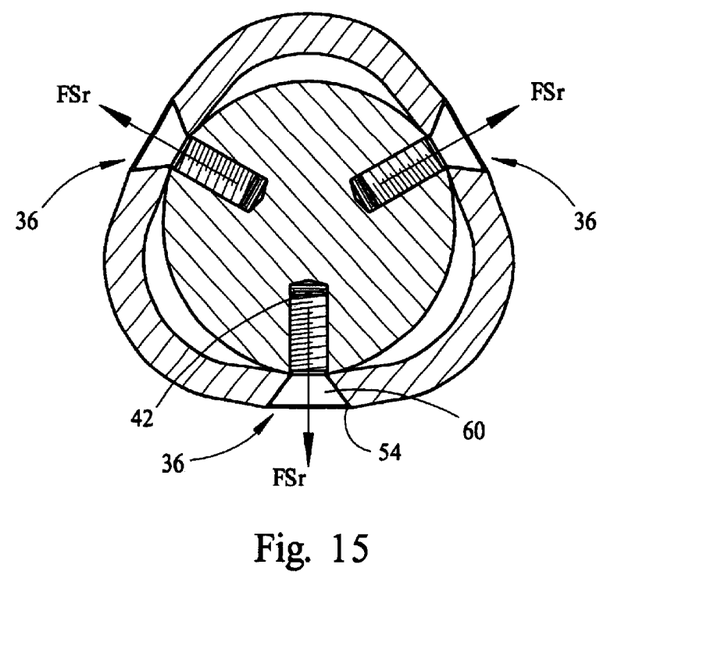
FIG. 15 shows the tool of FIG. 14, after forcibly screwing the retaining screws.

FIGS. 14 and 15 show, respectively, schematic cross-sectional views of the tool shown in FIG. 12 taken along line XIV—XIV, before and after firmly tightening the retaining screws. It is again mentioned that the spaces between the various parts and the distortions thereof have been exaggerated for clarification purposes.

As shown in FIG. 14, prior to forcibly screwing the retaining screws 36, there is a gap, of dimension h5, between the shank 40 and the adaptor 34. This gap is due to the difference between the outer diameter d3 of the shank 40 and the inner diameter d4 of the adaptor 34. The gap h5 which, for illustrational purposes, is shown to be uniform all around the adaptor bore is the required clearance which is essential for the free insertion of the cutting head shank into the adaptor bore. FIG. 15 shows the result of the action of the radial component FSr of the retaining force FS applied on the shank 40 by each of the retaining screws, when firmly tightened.

As shown, when the screws 36 are firmly tightened in the threaded bores 42, the conical portions 60 of the screws press against the front portions 54a of the conical bores 54 (see FIG. 13), thereby causing a forced displacement of the shank 40 relative to the adaptor 34 in the direction of the retaining force FS.

As seen in FIG. 15, the displacement of the adaptor relative to the shank, in an inward radial direction, results in the primary gap h5 being zero in the regions of the retaining screws 56 where the adaptor and the shank come into full contact.

The clamping mechanism as described above has an advantage over the prior art in the sense that the operating tolerance between the shank and the adaptor is practically zero, hence, inaccuracies and instability of the system are significantly reduced. Moreover, the more the screws are tightened, the greater the retaining force and the greater the contact area between the shank and the adaptor, adding to the stability of the system, in contrary with the prior art.

The clamping mechanism as described above has another advantage regarding the thickness of the adaptor wall t2. By having the screw threaded bores in the shank, instead of in the adaptor, the thickness of the adaptor wall t2 can be relatively small, since, as it will be appreciated, a relatively long thread would be required in prior art adaptors for properly supporting the retaining screws. Therefore, the diameter of the adaptor can be kept equal to, or smaller than, the diameter of the cutting head, a condition that is necessary for deep pocketing applications.

Figure 16:
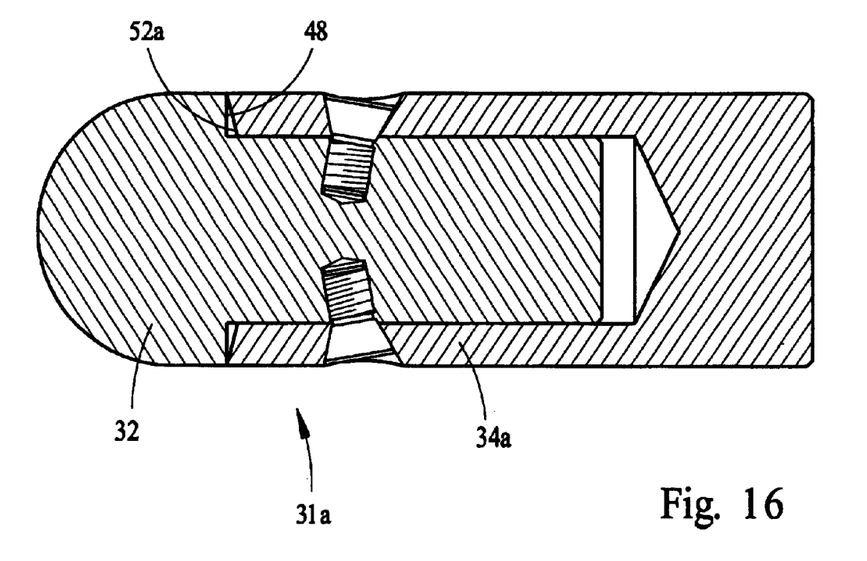
FIG. 16 is a partially sectioned side view of another embodiment of a clamping mechanism according to the present invention; and, FIG. 17 is a sectional side view of a portion of another embodiment of a clamping mechanism according to the present invention.

FIG. 16 shows another embodiment of the present invention. As shown, in a cutting tool assembly 31a, the front face 52a of the adaptor 34a is rearwardly slanted with respect to the rear surface 48 of the cutting head 42. Such an arrangement ensures that the axial abutment between the front face 52a and the rear surface 48 will take place initially along an outermost annular region. This gives the cutting tool assembly 31a greater stiffness against bending.

Figure 17:
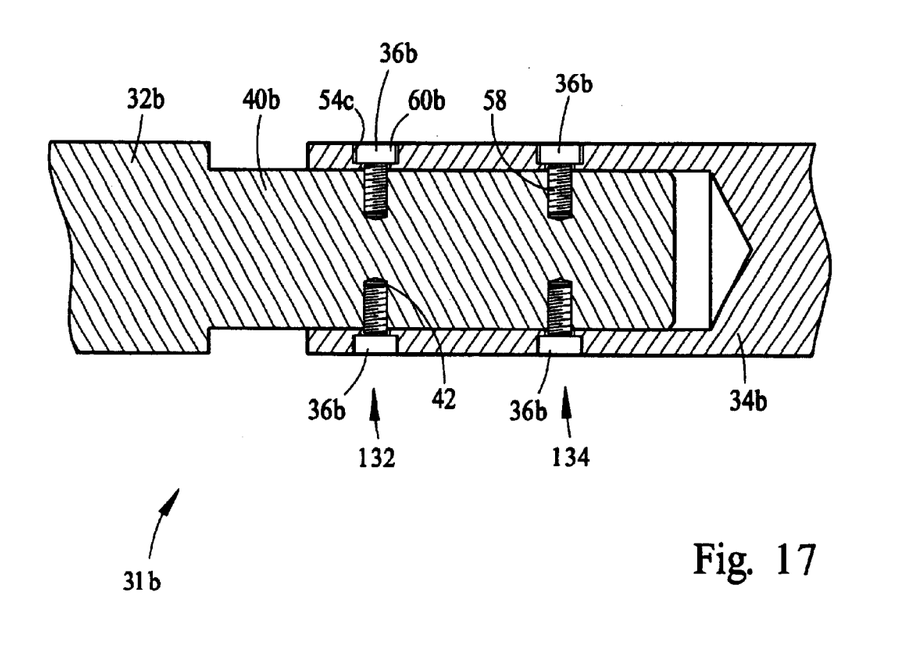

FIG. 17 shows still another embodiment of the present invention. As shown, a cutting tool assembly 31b comprises a cutting head 32b and an adaptor 34b. The cutting head 32b has a shank 40b having threaded bores 42. The threaded bores 42 are divided into axially separated groups 132 and 134. The threaded bores in each group are evenly peripherally distributed, radially directed and lie in a plane perpendicular to the longitudinal axis of the cutting tool assembly. The adaptor 34b has peripherally distributed radially directed through bores 54c that mate with the threaded bores 42 upon insertion of the shank 40b into the adaptor 34b. The adaptor 34b and the shank 40b are clamped by means of retaining screws 36a. Each screw 36a has a threaded portion 58 and a head portion 60b. Due to the straight construction of each head portion 60b and due to the radial direction of each screw 36b, the adaptor 34b is clamped to the shank 40b in a radial direction only. The fact that there is more than one group gives the cutting tool assembly 31b better clamping capability.

It will be readily appreciated that the present invention relates to a clamping mechanism in general and is not restricted to an adaptor and a cutting head mountable therein. For example, the adaptor can be provided with a shank and the shank receiving bore can be provided in the cutting head. The rear end of the adaptor 34 can have an integral shank similar to the shank 40 and will be referred to as an adapted shank. In this manner, the adapted shank can be received into another adaptor 34, whereby the latter becomes an extension adaptor. Such an extension adaptor can be clamped by another extension adaptor. The number of the adaptors in use is set by the machining requirements. The angle α in FIG. 12 can be chosen as zero, in which case the screw 36 is not slanted with respect to a radial direction, thus, the clamping mechanism can be used just for radial contraction of the adaptor against the shank, without applying any axial forces.

Although the present invention has been described to a certain degree of particularity, it should be understood that various alterations and modifications could be made without departing from the spirit or scope of the invention as hereinafter claimed.

What is claimed is:

1. A clamping mechanism for clamping members of a tool assembly, the tool assembly comprising:
   a shank receiving member; and
   a mounting member for mounting thereon;
   the mounting member having a rear surface and a shank with at least three clamping member receiving bores, the shank receiving member having a front face shank bore at a front face thereof and at least three unthreaded through bores, so that on inserting the shank into the shank bore the at least three unthreaded through bores are adjacent to the at least three clamping member receiving bores, the mounting member being clamped to the shank receiving member by at least three clamping members, the at least three clamping members passing through the at least three unthreaded through bores and retainably received in the at least three clamping member receiving bores; wherein
   said front face is circumferentially continuous.

2. The clamping mechanism according to claim 1, wherein each of the at least three clamping members is a screw and each of the at least three clamping member receiving bores is provided with a screw thread for threadingly engaging each of the screws.

3. The clamping mechanism according to claim 2, wherein each of the screws comprises a threaded portion and a conical portion.

4. The clamping mechanism according to claim 1, wherein each of said at least three unthreaded through bores is conical.

5. The clamping mechanism according to claim 1, wherein each of said at least three unthreaded through bores has an axis which is forwardly slanted.

6. The clamping mechanism according to claim 2, wherein each of said at least three clamping member receiving bores has an axis which is forwardly slanted.

7. The clamping mechanism according to claim 1, wherein said shank of said mounting member is cylindrical.

8. The clamping mechanism according to claim 7, wherein said shank bore is cylindrical.

9. The clamping mechanism according to claim 6, wherein each of said at least three screws passes through each of said at least three unthreaded through bores, is threadingly engaged into each of said screw thread of said at least three clamping member receiving bores, and said axis of each of said at least three unthreaded through bores is rearwardly displaced relative to said axis of each of said at least three clamping member receiving bores.

10. The clamping mechanism according to claim 1, wherein said mounting member constitutes a cutting head.

11. The clamping mechanism according to claim 1, wherein said front face is inwardly rearwardly slanted with respect to said rear surface.

12. The clamping mechanism according to claim 1, wherein said at least three clamping members constitute a group, the clamping mechanism having at least one group.

13. A clamping mechanism for clamping a cutting head to an adaptor;
   the adaptor having a shank receiving bore and three forwardly slanted unthreaded through bores;
   the cutting head for clamping to the adaptor having a shank with three forwardly slanted threaded bores;
   the arrangement being such that with the shank inserted into the shank receiving bore the cutting head is clamped to the adaptor by three retaining screws which pass through the unthreaded through bores and are threadingly engaged by the threaded bores.

14. A tool assembly including a clamping mechanism comprising:
   a shank receiving member comprising a shank receiving portion provided with a rearwardly extending shank bore, and at least three unthreaded through bores formed at an annular section of said shank receiving portion; and
   a mounting member comprising a rearwardly extending shank having at least three clamping member receiving bores, wherein
   the clamping mechanism is adjustable between:
      a first position in which the shank receiving member and the mounting member are disassembled, and
      a second position in which the shank is positioned in the shank bore with the at least three unthreaded through bores adjacent to the at least three clamping member receiving bores, and the mounting member is clamped to the shank receiving member by at least three clamping members, each of the at least three clamping members passing through a corresponding one of the unthreaded through bores and retainably received in a corresponding one of the three clamping member receiving bores.

15. The tool assembly according to claim 14, wherein the shank receiving portion has a circumferentially continuous front face.

16. The tool assembly including a clamping mechanism comprising:
    a shank receiving member comprising a shank receiving portion provided with a rearwardly extending shank bore, and at least three unthreaded through bores formed on said shank receiving portion; and
    a mounting member comprising a rearwardly extending shank having at least three clamping member receiving bores, wherein
    the clamping mechanism is adjustable between:
        a first position in which the shank receiving member and the mounting member are disassembled, and
        a second position in which the shank is positioned in the shank bore with the at least three unthreaded through bores adjacent to the at least three clamping member receiving bores, and the mounting member is clamped to the shank receiving member by at least three clamping members, each of the at least three clamping members passing through a corresponding one of the unthreaded through bores and retainably received in a corresponding one of the three clamping member receiving bores,
    and wherein:
        each of said at least three unthreaded through bores has an axis which is forwardly slanted; and
        each of said at least three clamping member receiving bores has an axis which is forwardly slanted.

17. The tool assembly according to claim 16, wherein the shank receiving portion is annular and has a circumferentially continuous front face.

18. A clamping mechanism for clamping members of a tool assembly, the tool assembly comprising:
    a shank receiving member; and
    a mounting member for mounting thereon;
    the mounting member having a rear surface and a shank with at least three clamping member receiving bores, the shank receiving member having a front face shank bore at a front face thereof and at least three unthreaded through bores, so that on inserting the shank into the shank bore the at least three unthreaded through bores are adjacent to the at least three clamping member receiving bores, the mounting member being clamped to the shank receiving member by at least three clamping members, the at least three clamping members passing through the at least three unthreaded through bores and retainably received in the at least three clamping member receiving bores.

* * * * *